Figure 1:
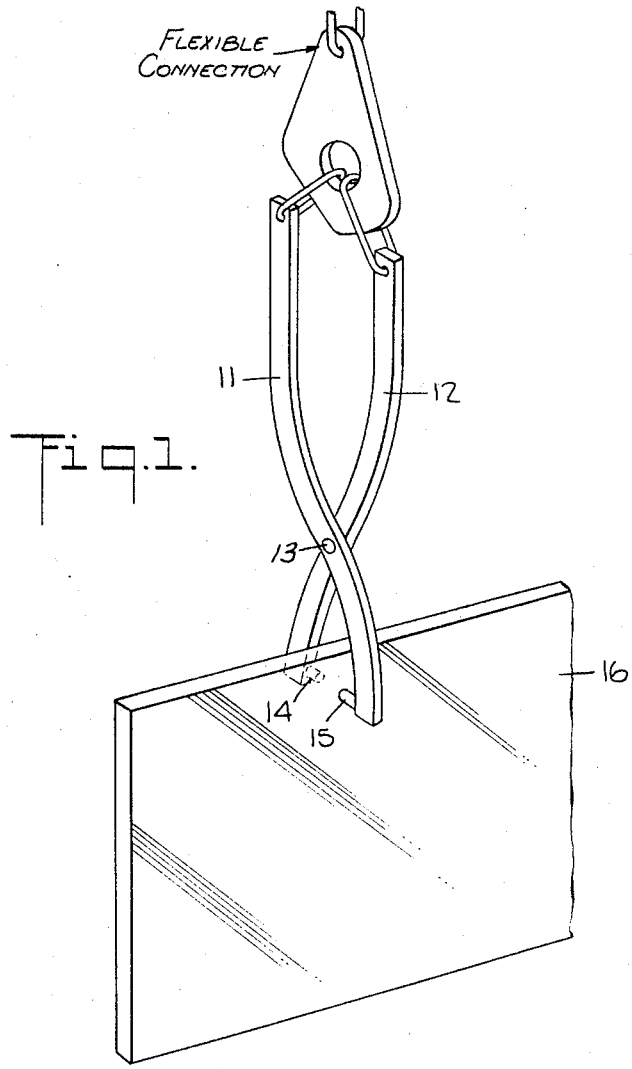

Sept. 20, 1966  F. JOCHIM  3,273,933
SELF-GRIPPING TONGS
Filed Dec. 10, 1963

INVENTOR.
FRIEDRICH JOCHIM
BY
Bauer & Seymour
ATTORNEYS 3,273,933
SELF-GRIPPING TONGS
Friedrich Jochim, Herzogenrath, Germany, assignor to Compagnie de Saint-Gobain, Neuilly-sur-Seine, France
Filed Dec. 10, 1963, Ser. No. 329,496
11 Claims. (Cl. 294—118)

It is known that different steps of the working or of the shaping of glass sheets require the heating of said glass sheets to a temperature closely related to the softening point. That is the case, for example, for tempering, enameling, bending, etc.

It is also known that, in order to prevent the warping or sagging of the heated products under their own weight, it can be advantageous to suspend them in vertical position. The tongs utilized for the suspension of the products are self-gripping tongs provided with pointed tips which exercise on the cold glass a sufficient gripping action to prevent the suspended products from slipping. When the temperature is raised to the softening point, the tips enter the glass mass and the penetration is the greater as the pressure is greater. To reduce the dimensions of the marks made by the points it is customary to reduce the pressure by increasing the number of tongs, but this is limited by the need to maintain enough pressure to hold the glass in the cold state.

Attempts were made to manufacture very sharp pointed tips but they scratch the glass and soon lose their sharpness, while the scratches they produce may initiate fractures which are detrimental to the preservation of the product. In addition, the sharp tips penetrate more deeply into the glass, modify the internal strains, and establish areas of reduced strength.

It is an object of the invention to provide "tips" having good adherence to cold glass. Such tips are obtained by embedding crystalline grains, diamond grains for example, in a binder, preferably a metallic binder.

The term "tips" must be taken in its general sense, to mean the end of the bit of the tongs, that part which comes in contact with the glass; said tips may be of any form, pointed or flattened or rounded, provided that they permit the projecting, hard, crystalline grains to penetrate the glass.

The sintering of diamond grains in a metallic binder is well known in the production of abrading tools and is used in this case but that method is not a part of the present invention. This invention is directed to the application of said sintering to making tips for the tongs that are to support glass products. The binder for the crystals may be bronze, iron, and the heavy metals.

Figure 2:
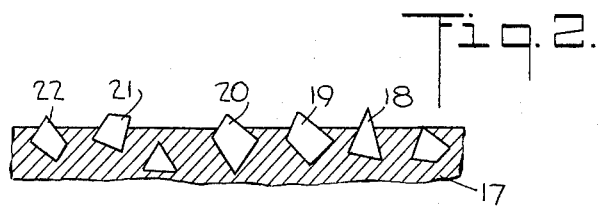

The tongs according to the invention are illustrated in the accompanying drawings, which show a preferred embodiment. In the drawings:

FIG. 1 is a perspective view of self-gripping tongs, as utilized in the glass industry, equipped with tips according to this invention; and FIG. 2 represents, on an enlarged scale, the structure of the surface of the tips according to the invention.

The tongs of FIG. 1 have two arms 11 and 12, connected by means of pivot 13. The lower ends of the arms of the tongs are provided with tips 14 and 15 having a cylindrical form terminating in a conical part which grips the glass sheet 16.

The structure of the surface of the tips is represented under magnification in FIG. 2, in which the binder 17 incorporates crystalline grains 18, 19, 20, 21, 22 which act when in contact with the glass as a multitude of secondary tips so that the gripping is considerably increased.

The tips according to the invention must overcome, without deterioration or oxidation, the temperature range utilized currently for many working operations, that is between 650 and 700° C. The binder must be chosen to prevent the formation in operation of an oxide capable of adhering to the glass, because such adherence would prevent the easy separation of the tongs after the operation on the glass has been completed.

It is not necessary that the grains incorporated in the binder be diamond because they are not submitted to high mechanical strains, and they need only to be capable of supporting temperatures of the order of 700° C. without deterioration, to have good resistance to abrasion, and not to break under shearing forces.

The crystal tips may be constituted of natural or synthetic precious stones or other crystalline material which has the properties cited above and which are not capable of reacting with or sticking to the glass at working temperatures.

According to a particular embodiment, the rounded tips constituting the bite of the tongs may be mounted in an oblique relation to the sheet or the supported product. In such a case a means permitting the rotation, from time to time, of each tip about its axis may be provided so as to substitute a new surface whenever the old is worn from use.

The tongs according to the invention may also be utilized for the suspension of sheets of glass in the cold state such, for example, as large sheets for shop windows or for unloading such windows under total or partial suspension, the gripping force being supplied by the shape of the tongs and the weight of the glass.

In many apparently widely different embodiments of the present invention may be made without departing from the spirit and scope thereof, it is to be understood that the invention is not limited to the specific embodiments.

What is claimed is:

1. Tongs adapted to suspend glass plates and the like which have arms pivoted together and gripping tips carried by the arms, the arms and tips being arranged to urge the tips toward each other when the tongs is suspended, in which the tips are constituted of crystalline grains embedded in a binder and projecting therefrom.

2. Self-gripping tongs according to claim 1 in which the binder is metal.

3. Self-gripping tongs according to claim 1 in which the crystalline grains are precious stones.

4. Self-gripping tongs according to claim 1 in which the crystalline grains are diamond grains.

5. Self-gripping tongs according to claim 2 in which the oxidization of the metal binder is negligible up to 700° C.

6. Self-gripping tongs according to claim 3 in which the crystalline grains are not capable of reacting with the glass.

7. Self-gripping tongs according to claim 1 in which the tips constituting bits of the tongs are mounted in an oblique relation to the surface of the suspended article.

8. Self-gripping tongs according to claim 7 in which the tips are provided with means enabling the rotation of each tip about its axis.

9. Tongs adapted to suspend glass plates and the like which have arms pivoted together and gripping tips carried by the arms, the arms and tips being arranged to urge the tips toward each other when the tongs is suspended, having gripping parts composed of a metal having a melting point above 700° C. and, incorporated therein, refractory crystals of which edge portions project from the surface of the metal.

10. Tongs according to claim 9 in which the tongs have holding means to receive the gripping parts, and are rotatably held by the tongs, whereby new gripping surfaces may be exposed by rotating said parts to new positions.

11. Tongs adapted to suspend glass plates and the like which have arms pivoted together and gripping tips carried by the arms, the arms and tips being arranged to urge the tips toward each other when the tongs is suspended, the tongs having conical gripping tips the surfaces of which are constituted by grains of refractory material embedded in and projecting from a binder capable of withstanding deterioration at temperatures circa 700° C., said tips being obliquely mounted and rotatable about their axes whereby different portions of their surfaces may be brought into gripping position.

References Cited by the Examiner

UNITED STATES PATENTS 2,765,000  10/1956  Bond.
3,008,752  11/1961  Hanneken _____ 294—118

GERALD M. FORLENZA, *Primary Examiner.*

HUGO O. SCHULZ, *Examiner.*

G. F. ABRAHAM, *Assistant Examiner.*